(12) United States Patent
Story et al.

(10) Patent No.: US 6,434,654 B1
(45) Date of Patent: Aug. 13, 2002

(54) SYSTEM BUS WITH A VARIABLE WIDTH SELECTIVITY CONFIGURABLE AT INITIALIZATION

(75) Inventors: Franklyn Hayward Story, Chandler; Jerry Michael Rose; D. C. Sessions, both of Phoenix, all of AZ (US); Paul Reeves Auvil, III, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/277,569

(22) Filed: Mar. 26, 1999

(51) Int. Cl.[7] .............................................. G06F 13/42
(52) U.S. Cl. ...................... 710/307; 710/71; 709/235; 709/237
(58) Field of Search ............................... 709/235, 237; 710/126–129, 71

(56) References Cited

U.S. PATENT DOCUMENTS

| 5,280,598 | A | * | 1/1994 | Osaki et al. | ............... | 710/127 |
| 5,781,747 | A |   | 7/1998 | Smith et al. | ............... | 395/309 |
| 5,937,174 | A | * | 8/1999 | Weber | ....................... | 711/113 |
| 6,002,882 | A | * | 12/1999 | Garde | .................... | 709/235 X |

FOREIGN PATENT DOCUMENTS

| EP | 410 314 A2 | 1/1991 | ........... G06F/13/12 |
| WO | 97/00481 | 1/1997 | ........... G06F/13/00 |
| WO | 98/59298 | 12/1998 | ........... G06F/13/00 |

* cited by examiner

*Primary Examiner*—Rupal Dharia
(74) *Attorney, Agent, or Firm*—Peter Zawilski

(57) ABSTRACT

A low pin count, moderate speed serial data bus that has a variable width for the transfer of data between devices of a computer system. The serial data bus can be selectively configured to be 1-bit, 4-bit, 8-bit or 16-bit wide. Data (including bus commands and addresses) carried by wider parallel buses are serialized into data blocks, which are then transferred by the serial data bus at a high speed. One feature of the present invention is that the pin count requirement for the present invention is low: only four control pins are required for controlling the data transfer mechanisms of the data bus. Another significant feature of the present invention is that the host and companion interfaces of the serial data bus can have non-matching widths. To allow for host and companion interfaces with non-matching widths, an initialization protocol is used to establish the effective width of the data bus at power-on reset.

20 Claims, 13 Drawing Sheets

SYSTEM BUS WITH A VARIABLE WIDTH SELECTIVITY CONFIGURABLE AT INITIALIZATION

FIELD OF THE INVENTION

The present invention pertains generally to the field of computer systems. More particularly, the present invention relates to the field of computer system bus architecture.

BACKGROUND OF THE INVENTION

A bus architecture of a computer system conveys much of the information and signals involved in the computer system's operation. One or more busses are used to connect a central processing unit (CPU) to a memory and to input/output elements so that data and control signals can be readily transmitted between these different components. When the computer system executes its programming, it is imperative that data and information flow as fast as possible in order to make the computer as responsive as possible to the user. In many hardware applications, such as, graphics adapters, full motion video adapters, small computer systems interface (SCSI) host bus adapters, and the like, it is imperative that large block data transfers be accomplished expeditiously. These applications are just some examples of subsystems which benefit substantially from a very fast bus transfer rate.

In many computer system architectures of today, the Peripheral Component Interconnect (PCI) bus is commonly used to achieve high bandwidth connectivity between peripheral devices and processors. Although the PCI bus has a high bandwidth, its full potential cannot be achieved by incorporating only a single PCI bus within a computer system. For instance, if too many electrical loads (e.g., devices) are placed on a PCI bus, it may cease to function correctly. As another example, the devices that populate a particular PCI bus may not co-exist together well. A master that requires a lot of bus time in order to achieve good performance must share the bus with other masters. Demands for bus time by these other masters may degrade the performance of the PCI bus.

These problems could be solved by adding one or more additional PCI buses into the system and re-distributing the device population. A system designer can add another PCI bus into the system by using a PCI-to-PCI bridge device. The PCI-to-PCI bridge provides a bridge from one PCI bus to another, but it only places one electrical load on its host PCI bus. The new PCI bus can then support a number of additional devices and/or PCI expansion connectors. In order to further increase the number of additional PCI devices, a system designer could include more than one PCI-to-PCI bridges in the system.

However, one problem associated with the addition of multiple PCI-to-PCI bridges is that only a limited number of PCI interfaces can be implemented on a single integrated circuit. Another problem is that circuit boards implementing the PCI bus require a very high trace density to accommodate the trace implementation, as well as all the electromagnetic interference (EMI) and radio frequency interference (RFI) shieldings. The addition of multiple PCI-to-PCI bridges in the system would require an even higher trace density, and would unnecessarily increase the manufacturing costs of the circuit boards.

Therefore, what is needed is a novel system and method for providing high data bandwidths between devices of a computer system. What is yet further needed is a system and method for reducing the interconnect cost of a parallel bus with minimal impact to the data rate.

SUMMARY OF THE INVENTION

The present invention provides a low pin count, moderate speed serial data bus with a variable width for the transfer of data between devices of a computer system. According to one embodiment of the present invention, the serial data bus may be selectively configured to be a 1-bit, 4-bit, 8-bit or 16-bit wide bus. Data (including bus commands and addresses) carried by wider parallel buses are serialized into bus-width-sized blocks, which are then transferred by the serial data bus at a high speed.

One feature of the present invention is that the pin count requirement is low. In one embodiment, a bi-directional data transfer protocol implemented with only four pins is used for controlling the data transfer mechanisms. Particularly, data transfers are controlled by two signals PACKET# and READY#. In one embodiment, the bus master initiates the data transfer by asserting the PACKET# signal. Then, the bus master transmits bus commands, addresses or event codes across the variable width data bus to the slave. When data is ready to be read, or when empty buffers are available, the slave asserts the READY# signal. Burst mode read and write requests are indicated by the bus master by keeping the PACKET# signal asserted through the cycle preceding the cycle that transferred the last bit of the data byte. A third signal REQ/GNT# is used to implement a single wire bus arbitration protocol for performing bus arbitration. A fourth signal required by the present embodiment is the bus clock signal CLK.

Another significant feature of the present invention is that the host and companion interfaces of the serial data bus can have non-matching widths. To allow for host and companion interfaces with non-matching widths, an initialization protocol is used to establish the effective width of the data bus at power-on reset. Particularly, after power-on reset, the effective width of the data bus is set to 1 bit. In this 1 bit mode, the host interface determines the width of the companion interface, and then sets the width of the data bus to the smaller of the host and companion interfaces.

Other significant features and advantages of the present invention not specifically mentioned here will become apparent in the detailed description below.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

In the following detailed description of the preferred embodiments, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

The present invention provides a low pin count, moderate speed system bus for the transfer of data at rates approaching 200 Mbytes per second. Data (including bus commands and addresses) carried by wider parallel buses are serialized into data blocks, which are then transferred by the serial data bus at a high speed. The interface requirements are four control pins plus either 1, 4, 8, or 16 data pins. The low pincount significantly reduces the interconnect cost with minimal impact to the data rate. In addition, the selectable width of the data bus supports a range of performance and pincount options.

Figure 1:
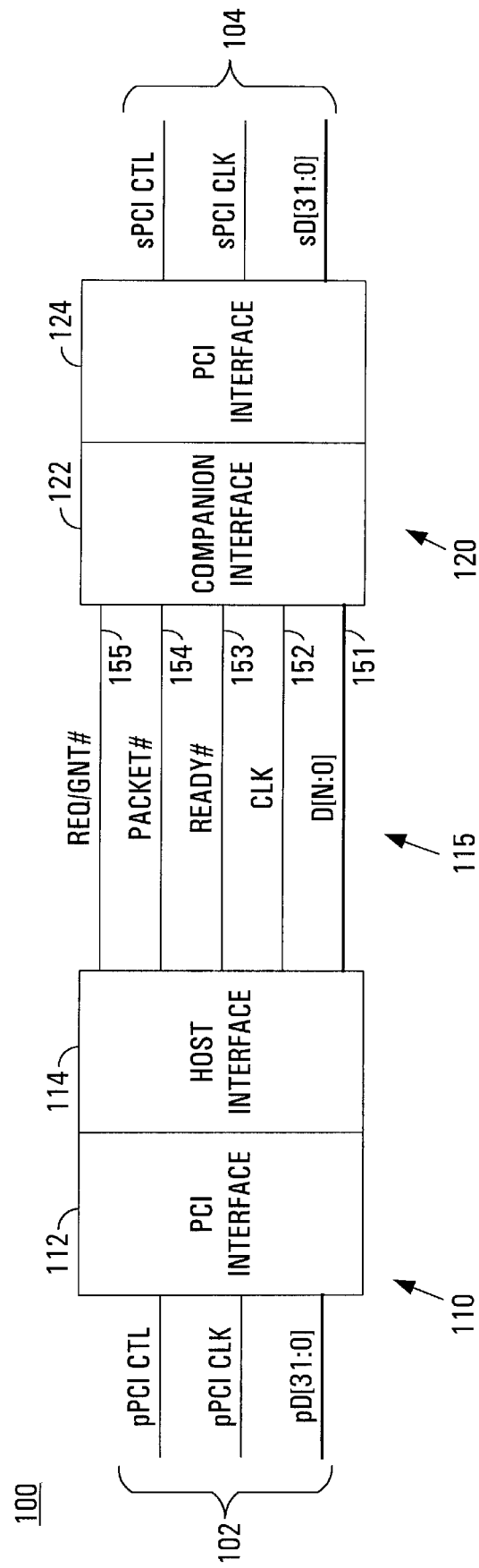
FIG. 1 illustrates an exemplary implementation of the serialized system bus in accordance with one embodiment of the present invention.

FIG. 1 is a block diagram illustrating a PCI-to-PCI bridge 100 in accordance with one embodiment of the present invention. As illustrated, PCI-to-PCI bridge 100 includes a host chip 110 and a companion chip 120. Host chip 110 includes a first PCI interface 112 and a host interface 114. Companion chip 120 includes a companion interface 122 and a second PCI interface 124. The first PCI interface 112 is for coupling to a primary PCI bus 102 and the second PCI interface 124 is for coupling to a secondary PCI bus 104. According to the present invention, host chip 110 may be implemented within a host computer system and the companion chip 120 may be implemented within a computer peripheral device, such as a sound card or a network interface card. Host interface 114 is coupled to companion interface 122 via serial bus 115. Significantly, in the present embodiment, the serial bus 115 has a variable width data bus 151 which may be 1-bit, 4-bit, 8-bit or 16-bit wide.

According to the present embodiment, the host interface 114 is responsible for all central control functions, including bus arbitration and clock management. In addition, the host interface 114 provides master functionality for host-master data transfers, and target functionality for companion master mode data transfers. Importantly, the host interface 114 is responsible for setting the effective width of the variable width data bus 151 through the use of bus commands and event encodings. The mechanisms for setting the width of the data bus 151 are discussed in greater detail in the sections below.

With reference still to FIG. 1, the companion interface 122 provides target functionality for host-master data transfers, and master functionality to support Direct Memory Access (DMA) and master requirements of subordinate devices. Accordingly to the present invention, the companion interface 122 is configured for responding with its bus width whenever prompted to do so by the host interface 114.

It should be noted that a typical implementation of a standard point-to-point PCI interconnect requires 50 to 60 pins at both the host and the target devices, and requires a large signal path. According to the present invention, bus commands, addresses and data carried in parallel by the PCI bus are serialized into data blocks, and are transmitted across serial bus 115. In the present embodiment, the serial bus 115 can be as narrow as 5 bits and as wide as 20 bits. In this manner, pincount and interconnect cost are significantly reduced.

In order to further reduce pincount, a single bi-directional signal protocol is used to control requesting and granting of the data bus 151 of the present invention. In the illustrated embodiment, the bi-directional control signals include a REQ/GNT# signal, a PACKET# signal and a READY# signal. Further, in the illustrated embodiment, REQ/GNT# is carried by signal line 155, PACKET# is carried by signal line 154, READY# is carried by signal line 153, and bus clock CLK is carried by signal line 152.

The control signals REQ/GNT#, PACKET# and READY#, and bus clock CLK of the present embodiment are defined below in Table 1.

TABLE 1

| Signal Name | Signal Type | Signal Definition |
|---|---|---|
| REQ/GNT # | IO-STS | Bus Master Request/Grant<br>This bidirectional signal controls bus arbitration between the host and the companion devices. It acts as both the request and grant function pin. This signal is synchronous to CLK. |
| PACKET # | IO-STS | Master Transaction<br>This signal is asserted when a master wishes to start a transaction. It remains asserted through the last data byte transfer request. Since the deassertion of PACKET # indicates the end of the transaction, there can be no master wait states during any part of the transaction. |
| READY # | IO-STS | Slave Ready<br>This signal is asserted when a slave is ready to respond to a master's transaction request. It remains asserted through the last data byte transferred. Since the deassertion of READY # indicates the end of the data transfer, there can be no slave wait states between data transfers. |
| D[7:0] | IO-STS | Data Bus<br>The data bus is 8 bits wide in its natural state, but may also be 1 bit, 4 bits or 16 bits wide. After reset, the bus defaults to 1 bit wide. The width of the bus may then be negotiated upward by control transactions initiated by the host. During the command phase of transactions, control signals (bus commands) are followed by address bits (most significant bit first) which are followed |

TABLE 1-continued

| Signal Name | Signal Type | Signal Definition |
|---|---|---|
| | | by data bits. However, data bits are transferred least significant bit first. |
| CLK | I-C | Bus Clock |
| | | The clock may run at any frequency from 0 Hz to whatever the design technology will support. The frequency is not constant and may vary wildly from cycle to cycle. The host and companion devices must be able to sense and generate a bus request asynchronously to support reception of asynchronous events from the companion device when the clock is stopped. |

Legend:
C CMOS-compatible input
I Input-only pin
IO Bi-directional pin
STS Sustained three-state output /TTL input It should be appreciated that the present invention is not limited to providing a point-to-point interconnect between two PCI devices. Rather, the present invention may be used to provide connection between different bus interfaces. For example, the present invention may be used to connect a PCI device to a PCMCIA device. In that case, a PCI-to-Serial bus bridge can be constructed in the host chip 110, and a Serial-to-PCMCIA bus bridge can be constructed in the companion chip 120. It should also be appreciated that the present invention may be implemented within host and target devices, thus eliminating the need of bus bridges.

Figure 2:
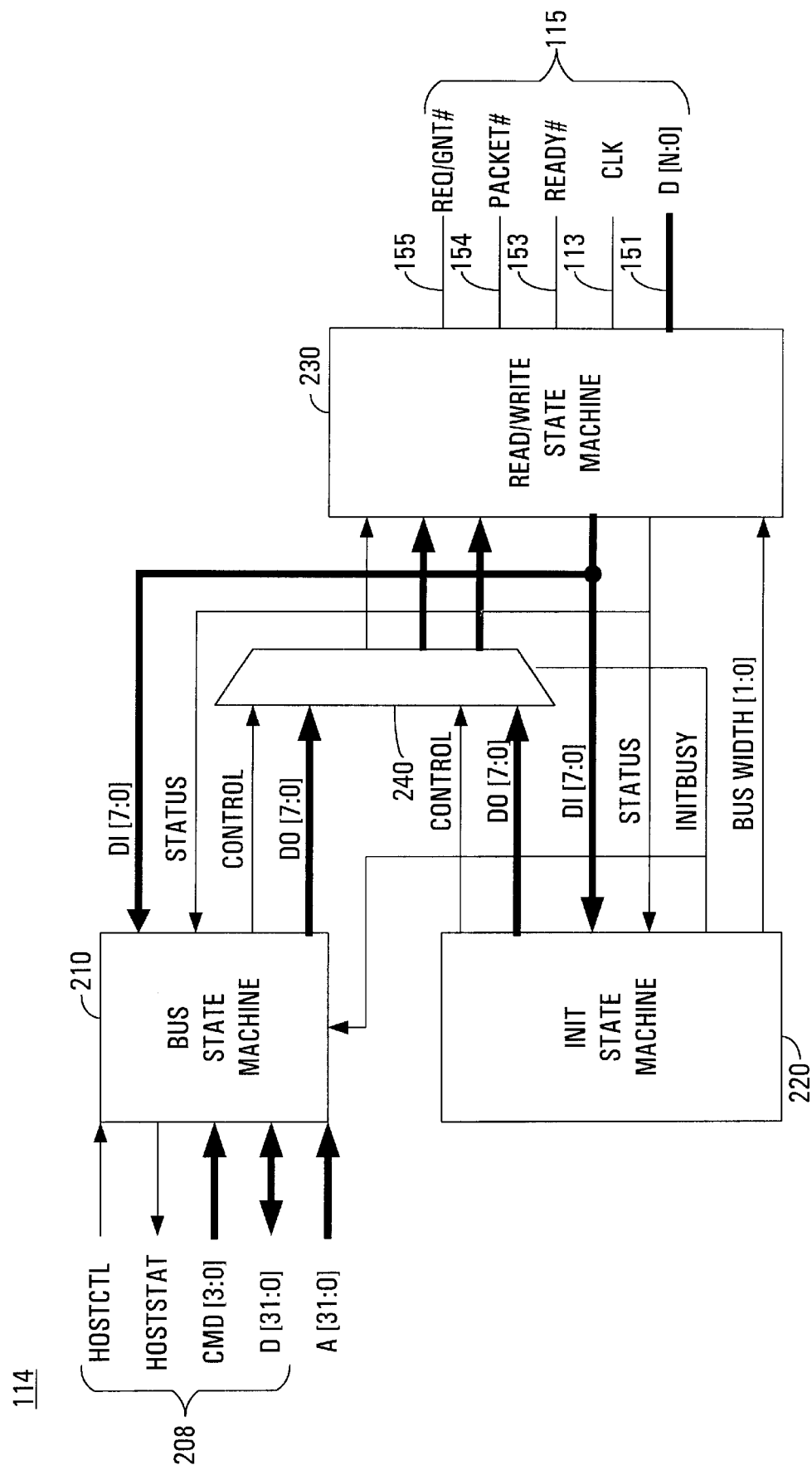
FIG. 2 is a logical block diagram illustrating an exemplary implementation of a host interface in accordance with one embodiment of the present invention.

FIG. 2 is a logical block diagram of the host interface 114 in accordance with one embodiment of the present invention. As shown, host interface 114 includes a bus state machine (BSM) 210, an initialization state machine (ISM) 220, a read/write state machine (R/WSM) 230, and a multiplexer (mux) 240. It should be appreciated that FIG. 2 is for illustrating the relationship between initialization mode and normal mode operations of the host interface 114. It should also be appreciated that many different implementations for host interface 114 are possible and that the present invention should not be construed to be limited to any specific implementation.

Normal Mode Operations of the Host Interface

In the illustrated embodiment, the BSM 210 implements a generic parallel bus 208 that allows easy adaptation to any standard bus (PCI, PCMCIA, etc.) or target devices. Particularly, bus 208 includes signal lines for host control signal HostCtl, and for status signal HostStat. In addition, the bus 208 includes a 4-bit command bus 214 for communicating bus commands, a 32-bit data bus 216 for communicating data, and a 32-bit address bus 218 for communicating addresses. In normal mode operation, an InitBusy signal (a control signal generated by ISM 220) is FALSE (deasserted), and BSM 210 is configured for communicating with R/WSM 230. Further, BSM 210 is configured for serializing the bus commands, data, and addresses received from the bus 208 into byte-size blocks, most significant byte first, and transfers the blocks to the R/WSM 230 via mux 240.

In the present embodiment, bus commands are transferred first, then address bytes and finally data bytes. It should be noted that BSM 210 may also be configured for serializing the bus commands, data and addresses into blocks of different sizes depending on the effective width of the data bus 151.

According to the present embodiment, R/WSM 230 translates the internal bus transactions into bus transactions on the serial bus 115. In addition, the R/WSM 230 is responsible for implementing a bi-directional data transfer protocol for the serial bus 115. The data transfer mechanisms of the bi-directional protocol are described in the sections below.

With reference still to FIG. 2, in the illustrated embodiment, the bus 208 is configured for receiving 4-bit wide bus commands which provide for the selection of specific data transactions, e.g., broadcast write, memory read, I/O write, etc. The bus commands according to the present embodiment are provided below in Table 2.

TABLE 2

| C[3:0] | Command Description |
|---|---|
| 0000 | Reserved. This command is unused. [PCI interrupt acknowledge] |
| 0001 | Reserved. This command is unused. [PCI special cycle] |
| 0010 | I/O Read. The address in the 64K I/O space is specified by A[15:0]. |
| 0011 | I/O Write. The address in the 64K I/O space is specified by A[15:0] |
| 0100 | Broadcast Write. An event code is broadcast without an address. |
| 0101 | Reserved. |
| 0110 | Memory Read. The address in the 4G memory space is specified by A[31:0]. |
| 0111 | Memory Write. The address in the 4G memory space is specified by A[31:0]. |
| 1000 | Reserved. |
| 1001 | Reserved. |
| 1010 | Configuration Read. The address in the 256 byte configuration space is specified by A[7:0]. |
| 1011 | Configuration Write. The address in the 256 byte configuration space is specified by A[7:0]. |
| 1100 | Memory Read Multiple. Like memory read, except that prefetching should be used. |
| 1101 | Reserved. This command is unused. [Dual Address Cycle] |
| 1110 | Memory Read Line. Like memory read, except that limited prefetching should be used. |
| 1111 | Reserved. This command is unused. [Memory Write and Invalidate] |

It should be noted that the bus commands of Table 2 are developed for the PCI-to-PCI bus bridge 100, and that the bus commands overlap the command encoding of the standard PCI interface. PCI command codes that are not used by the serialized system bus of the present invention are reserved as unused commands. Commands that were reserved by PCI are either used by the serial bus 115 of the present invention as new commands or continue to be reserved for future usage.

In normal mode operations, the host interface 114 may act as a master or a slave. According to the present embodiment, in master mode, the control signal HostCtl includes an address strobe that indicates the start of a transaction and a burst enable signal that indicates that successive sequential data transfers will occur in the transaction. The burst enable is set false during the clock period of the last data transfer. When a master device (not shown) asserts the address strobe, the master device must be ready to complete the entire transaction with no wait states. The status signal Hoststat includes a ready signal that indicates when the data transfer has been accepted (for data write transfers) or is valid (for data read transfers), and a stop signal that indicates an abnormal termination of a transaction. If an abnormal termination occurs, the data at the time of the termination is invalid and no further data is provided.

In slave mode, the control signals are changed to status signals so that the address strobe becomes a ready signal and the burst enable becomes a stop signal. The status signals are changed to control signals so that the ready signal becomes an address strobe and the stop signal becomes a burst enable.

Initialization Mode Operations of the Host Interface

With reference still to FIG. 2, ISM 220 is responsible for the dynamic sizing of the data bus 151, and is configured for communicating with the R/WSM 230 whenever the Init-Busy signal is TRUE (asserted). Particularly, in initialization mode, ISM 220 is configured for providing serialized bus commands, data, and addresses to the R/WSM 230 via mux 240. In addition, the ISM 220 is configured for providing a BusWidth signal to R/WSM 230. In the present embodiment, the ISM 220 sets InitBusy TRUE and Bus-Width to a value corresponding to an interface width of 1-bit at power-on, and sets InitBusy FALSE when it has completed the dynamic bus sizing procedure.

In accordance with the present embodiment, ISM 220 initiates the dynamic bus sizing procedure by generating a "broadcast write" bus command and by providing an 8-bit event code during the address phase of the bus cycle. The event codes according to the present embodiment are defined in Table 3 below.

TABLE 3

| EV[7:0] | Event Description |
|---|---|
| 00h | NOP. This code causes nothing more than bus activity. |
| 01h | Bus Width 1. This code indicates the width of the master's bus is 1 bit. When the Host broadcasts this code, the Host and Companion must alter the current bus width to the specified number of bits. Note: If the Host bus interface is capable of only a serial link, the negotiation is over by default and the Host will only broadcast this command during the POR negotiation phase. |
| 02h | Bus Width 4. This code indicates the width of the master's bus is 4 bits. When the Host broadcasts this code, the Host and Companion must alter the current bus width to the specified number of bits. |
| 03h | Bus Width 8. This code indicates the width of the master's bus is 8 bits. When the Host broadcasts this code, the Host and Companion must alter the current bus width to the specified number of bits. |
| 04h | Bus Width 16. This code indicates the width of the master's bus is 16 bits. When the Host broadcasts this code, the Host and Companion must alter the current bus width to the specified number of bits. |
| 05-0Fh | Reserved. |
| 10h-1Fh | Interrupt 0 to 7. These codes provide event reporting for eight interrupt signals, indicated by bits 2:0. The new state of the interrupt signal is indicated by bit 3. |
| 20h | Power Management Event. |
| 21h-7Fh | Reserved. |
| 80h | Bus Width Inquiry. This code causes the slave to do a broadcast of its bus width. This code is only issued by the Host. |
| 81h | Bus Width 1. This code indicates the widest bus width of the companion's bus is 1 bit. When the Host broadcasts the Bus Width Inquiry, the companion will respond with this code if it is capable of only a serial interface. |
| 82h | Bus Width 4. This code indicates the widest bus width of the companion's bus is 4 bits. When the Host broadcasts the Bus Width Inquiry, the companion will respond with this code if it is capable of a 4 bit interface. |
| 83h | Bus Width 8. This code indicates the widest bus width of the companion's bus is 8 bits. When the Host broadcasts the Bus Width Inquiry, the companion will respond with this code if it is capable of a 8 bit interface. |
| 84h | Bus Width 16. This code indicates the widest bus width of the companion's bus is 16 bits. When the Host broadcasts the Bus Width Inquiry, the companion will respond with this code if it is capable of a 16 bit interface. |
| 85-FFh | Reserved. |

According to the present embodiment, the events codes are generated by ISM 220 and are transferred from the host interface 114 to the companion interface 122 via the serial bus 115. Significantly, the event codes include a Bus Width Inquiry event (event code 80h) which prompts the companion interface 122 to respond with its bus width (e.g., event codes 81h–84h). Further, the event codes may include Set Bus Width events (e.g., event codes 01h–04h), which causes the host interface 114 and the companion interface 122 to alter their bus widths accordingly.

Normal Mode and Initialization Mode Operations of the Companion Interface

According to one embodiment of the present invention, implementation of the companion interface 122 is similar to that of the host interface 114. The companion interface 122 and the host interface 114 have the same normal mode operations. The difference between host interface 114 and companion interface 122 is that the host interface 114 is configured for initiating the bus sizing procedure while the companion interface 122 is configured for responding to commands generated by the host interface 114. For instance, the host interface 114 generates a Bus Width Inquiry event during initialization. The companion interface 122, upon receiving the event, responds with a BusWidth event to indicate its width.

BUS WIDTH NEGOTIATION MECHANISMS OF THE PRESENT INVENTION

According to the present embodiment, the data bus 151 of the serial bus 115 may be dynamically adjusted to either 1, 4, 8 or 16 bits wide depending on the physical implementation of the host chip 110 and the companion chip 120. For example, in one embodiment, the host interface 114 may have 16 data pins and the companion interface 122 may have 4 data pins. In order to enable data transfers between the host and companion interfaces with disparate data bus widths, an initialization protocol is used to establish the effective width during initialization of the data bus.

Figure 13:
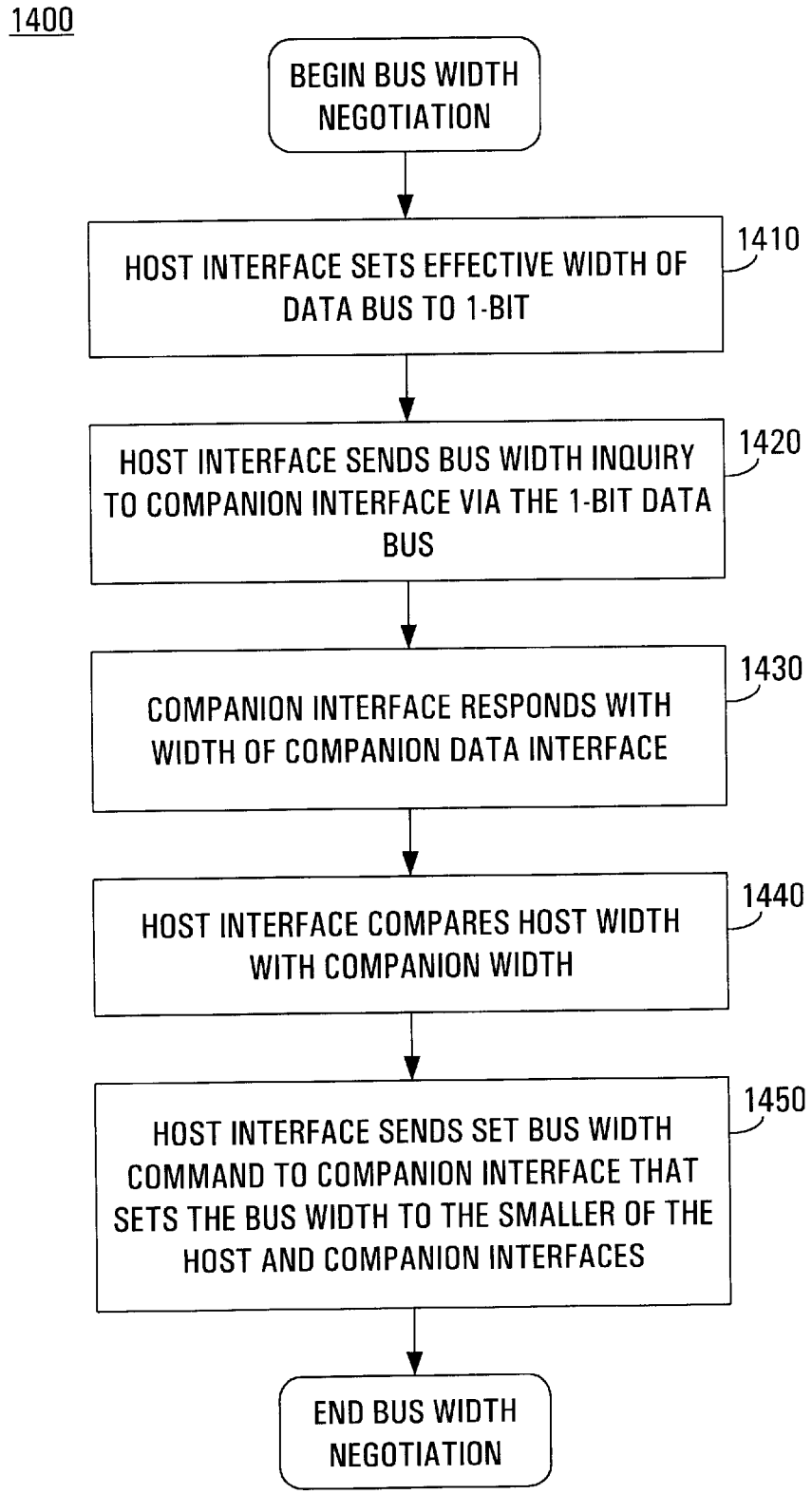
FIG. 13 is a flow diagram illustrating the steps of the bus size negotiation procedure in accordance with the present embodiment.

FIG. 13 is a flow chart 1400 illustrating the steps of the bus size negotiation procedure in accordance with the present embodiment. The steps of FIG. 13 will be described in conjunction with FIG. 1 and 2 and Tables 1–3. After power-on reset, the effective data bus width of both the host and the companion interfaces are automatically set to 1-bit. TO support re-initialization of the bus width after power-on, at step 1410 the host interface 114 automatically sets the effective width of the data bus 151 to 1-bit. According to the present embodiment, step 1410 may be accomplished by transmitting a bus command (e.g., broadcast write command 0100 of Table 2) and an event code (e.g., event code 01h) from the host interface 114 to the companion interface 122. The companion interface 122, after receiving the bus command and the event code, will treat the data bus 151 as 1-bit wide.

At step 1420, in this 1-bit mode, the host interface 114 sends a Bus Width Inquiry to the companion interface 122. In the present embodiment, step 1420 can be accomplished by transmitting a broadcast write command (e.g., command code 0100) and then a Bus Width Inquiry event (e.g., event code 080h) to the companion interface 122. Further, because the effective width of the data bus 151 has been set to 1-bit at step 1410, four clock cycles are needed for the transfer of the 4-bit bus command and eight clock cycles are needed for transfer of the 8-bit event code.

At step 1430, upon receiving the Bus Width Inquiry, the companion interface 122 responds with the widest width of its data interface. In the present embodiment, step 1430 can be accomplished with the transmission of a broadcast write command (e.g., command code 0100), and then a Bus Width event (e.g., event code 81h–84h) to the host interface 114. For example, if the data interface of companion interface 122 is 8-bit wide, it will send the host interface 114 a broadcast write command 0100 and an event code of 83h. It should be noted that the effective width of the data bus 151 remains 1-bit during the bus size negotiation procedure in the present embodiment.

At step 1440, the host interface 114 then compares the width of its data interface with that of the companion interface 122.

Then, at step 1450, the host interface 114 sends a Set Bus Width event (e.g., event code 01h–04h) that sets the effective width of the data bus 151 to the smaller of the host and companion interfaces 114 and 122. For example, if the width of data interface of the host is 4-bit and the width of the data interface of the companion is 8-bit, the host interface 114 will broadcast the event code 02h, setting the effective width of the data bus 151 to 4-bit. Thereafter, the bus width negotiation process ends.

It should be noted that, if host interface 114 has a 1-bit wide data interface, it is not required to perform all the steps of the width initialization procedure 1400. Rather, the host interface 114 can set the effective width of the data bus 151 to 1-bit wide, and then ends the initialization procedure 1400.

BI-DIRECTIONAL DATA TRANSFER PROTOCOL IN ACCORDANCE WITH THE PRESENT INVENTION

In order to reduce pin count, the present invention employs a bi-directional data transfer protocol to control the requesting and granting of the serial data bus 151. FIGS. 3 to 12 are exemplary timing diagrams illustrating the bi-directional protocol in accordance with one embodiment of the present invention. For simplicity, in the following examples, it is assumed that the effective width of the data bus 151 is 8-bit. However, it should be appreciated that the data bus 151 can also be 1-bit, 4-bit or 16-bit wide. In those instances, the number of clock cycles required for transferring the commands, addresses and data would be changed accordingly. Further, it is assumed that the master and the slave can be either host interface 114 or companion interface 122. In addition, it should be noted that, in FIGS. 3 to 12, the signals REQ/GNT#, PACKET#, READY# and CLK are carried by lines 155, 154, 153, and 152, respectively.

A. Read Transfers

Figure 3:
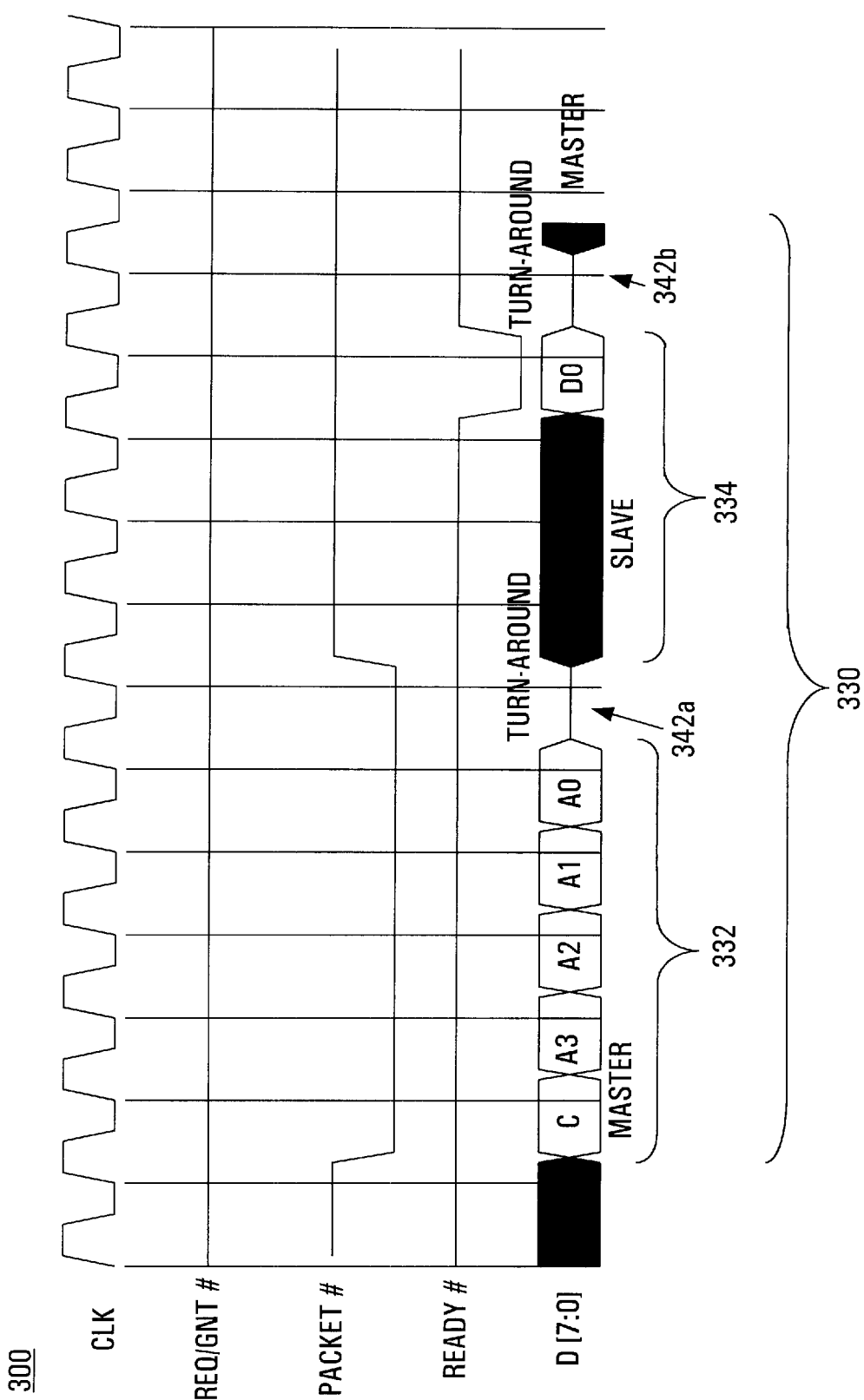
FIG. 3 illustrates an exemplary data read transaction timing diagram in accordance with one implementation of the present invention.

FIG. 3 is a timing diagram 300 illustrating a single-byte read transaction 330 of the PCI-to-PCI bus bridge 100 in accordance with one embodiment of the present invention. Importantly, as illustrated in FIG. 3, the single-byte read transaction 330 has a command phase 332 and a data phase 334, with turn-around cycles 342*a*–342*b* bracketing the data phase 334. The first turn-around cycle 342*a* allows the bi-directional data bus 151 to change direction after the command phase 332. After the first turn-around cycle 342*a*, the slave is responsible for driving the data signal lines even if its data is not yet ready to be returned. The second turn-around cycle 342*b* allows the data bus 151 to be driven by the master.

According to the present embodiment, the packet request signal PACKET# and the ready signal READY# control the read transaction 330. As illustrated in FIG. 3, the master begins the transfer by asserting the PACKET# signal. During the command phase 332 of the read transaction 330, 4-bit bus command and a 32-bit address are transferred on consecutive clock cycles. In the present embodiment, the bus command is transferred on the least significant four bits of the data bus 151 during the first cycle of the command phase 332. In another embodiment, if the serialized system bus is 1 bit wide, the bus command will be transferred in four clock cycles, with the most significant bit of the bus command being transferred first.

Because it is assumed that the data bus 151 is effectively 8-bit wide, the 32-bit address needs to be transferred in 4 clock cycles. Thus, as illustrated, the address is transferred in the second through fifth cycles of the command phase 332, with the most significant byte being transferred first. By providing the most significant bits of the address first, the target can be doing address decode in parallel with receiving the least significant bits of the address. In other embodiments of the present invention, if the data bus 151 is 16-bit wide, the 32-bit address will require two clock cycles; if the data bus 151 is 4-bit wide, then eight clock cycles will be required to transfer the 32-bit address. Similarly, if the data bus 151 is 1-bit wide, thirty-two clock cycles will be required to transfer the entire 32-bit address.

With reference still to FIG. 3, PACKET# remains asserted throughout the command phase 332. In the present embodiment, since only one data byte is requested, PACKET# is deasserted following the address cycles. However, in other embodiments, if the bus width were 4 or 1, then PACKET# would remain asserted through the cycle preceding the cycle that transferred the last bit of the data byte.

Following the turn-around cycle 342*a*, the slave drives the data bus 151. The slave, however, may not immediately have data ready in its transfer buffers, and READY# remains deasserted. When the slave has gathered the requested data in its buffers, it begins the transfer by putting the data on the data bus 151 and asserting READY#. After the first byte is transferred, the slave determines whether PACKET# is asserted. If PACKET# is not asserted, indicating that no more data is being requested, the slave terminates the transfer by deasserting READY#. The master then regains control of the data bus 151.

As illustrated in FIG. 3, the overhead of a 5-cycle command phase 332 and two turn-around cycles 342*a*–342*b* is relatively inefficient for the single-byte read transaction 330. The data bandwidth, however, can be significantly improved by bursting data whenever possible. Accordingly, the present invention is also configured for data bursting transactions.

Figure 4:
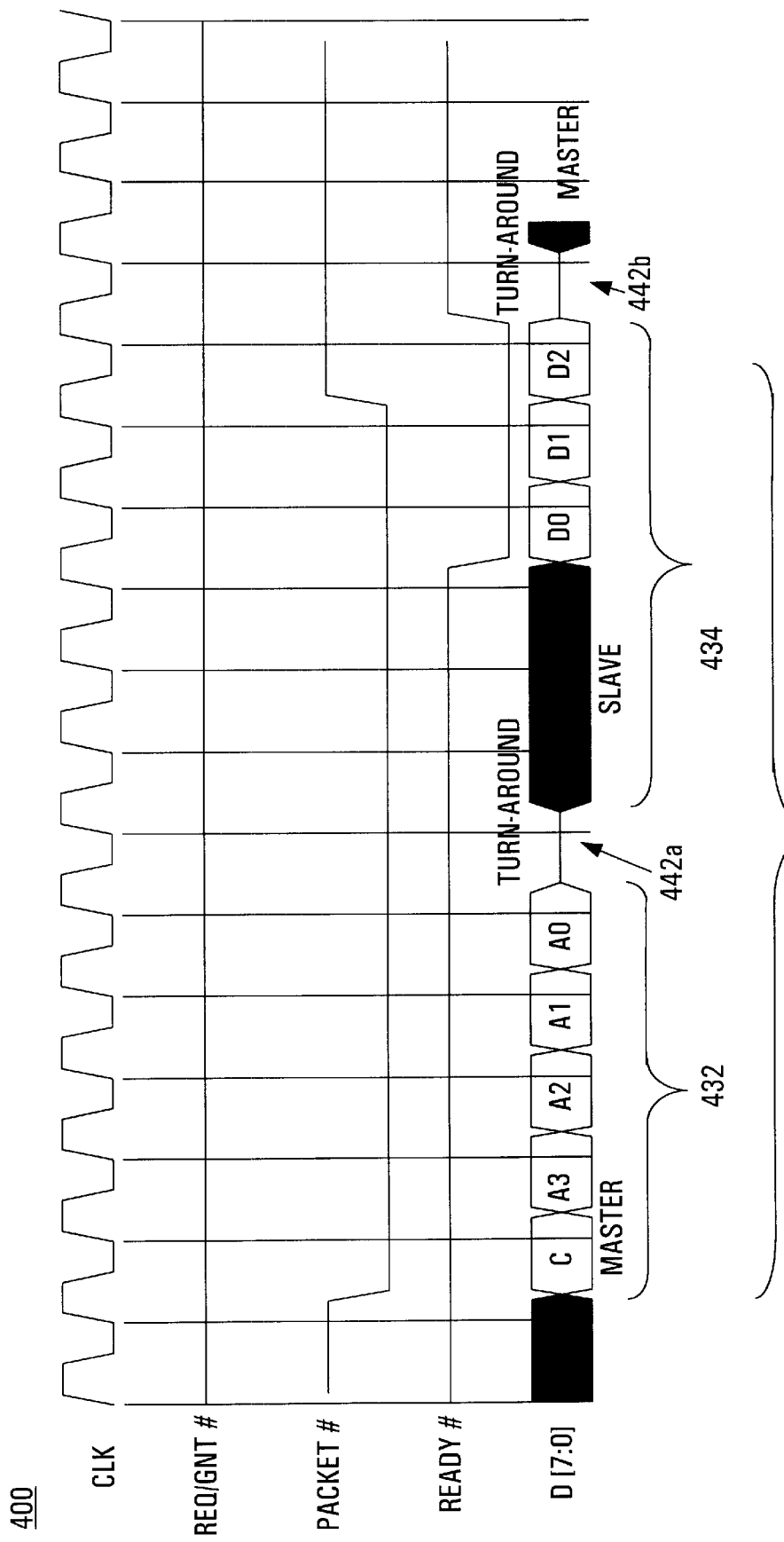
FIG. 4 illustrates another exemplary data read transaction timing diagram in accordance with one implementation of the present invention.

FIG. 4 is a timing diagram 400 illustrating a burst mode read transaction 430 in accordance with one embodiment of the present invention. As illustrated, burst mode read transaction 430 includes a command phase 432 that is similar to command phase 332 of FIG. 3, and a data phase 434 bracketed by two turn-around cycles 442*a*–442*b*. In the present embodiment, the request for the first byte is indicated by keeping PACKET# asserted in the first cycle after the command phase. The request for the second byte is indicated by keeping PACKET# asserted when the first byte is transferred. The request for the third byte is indicated by keeping PACKET# asserted when the second byte is transferred. In other words, PACKET# remains asserted through the cycle preceding the cycle that transferred the last bit of the data bytes. On the next cycle, PACKET# is deasserted, indicating that there are no more bytes being requested. READY# is asserted to indicate that data is ready in the transfer buffer of the slave, and remains asserted with the transfer of the last data byte. When there are no more data bytes requested, READY# is deasserted, ending the burst transaction 430.

B. Write Transfers

Figure 5:
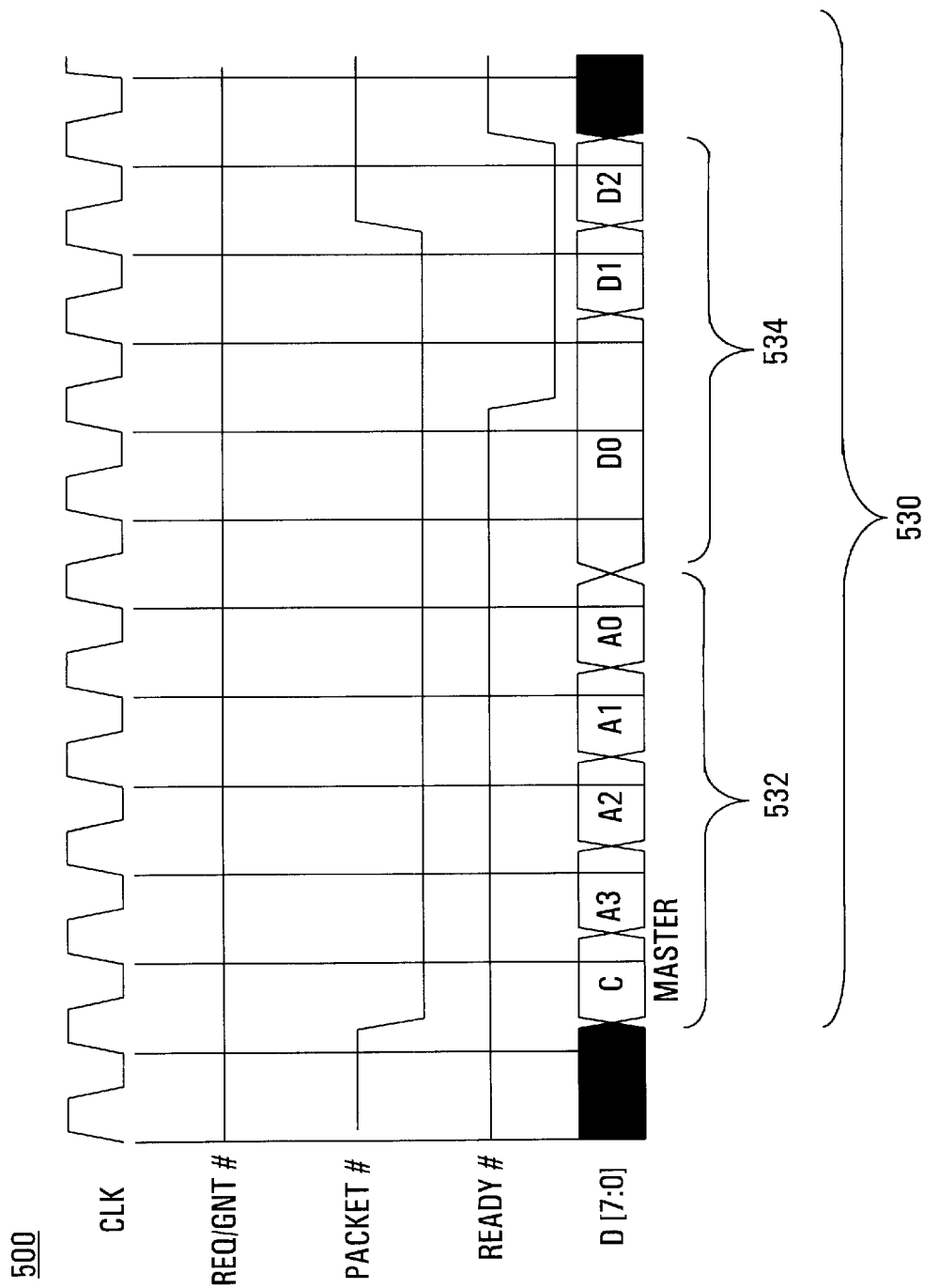
FIG. 5 illustrates an exemplary data write transaction timing diagram in accordance with one implementation of the present invention.

A timing diagram 500 of a basic write transfer transaction 530 of the PCI-to-PCI bus bridge 100 is shown in FIG. 5. As illustrated in FIG. 5, similar to read transfer transactions 330 and 430, write transfer transaction 530 includes a command phase 532 and a data phase 534. However, unlike the read transfer transactions 330 and 430, write transfer transaction 530 has no turn-around cycles bracketing the data phase 534. The turn-around cycles are not required because the data signal lines do not change direction when the master drives the write data to the slave. Rather, the master drives the data bus 151 immediately after the command phase 532.

As with the read transfer transactions 330 and 430, the packet request signal PACKET# and the ready signal READY# control the write transaction 530. Particularly, in the illustrated embodiment, the master requests a transfer by asserting PACKET# and the slave responds by asserting READY#.

With reference still to FIG. 5, the master begins the write transaction 530 by asserting the PACKET# signal and entering the command phase 532. The bus command and address bytes are transferred on consecutive clock cycles of the command phase 532. PACKET# remains asserted until the cycle immediately preceding the last data cycle. However, if the master writes a single byte of data, it would deassert PACKET# after the command phase.

Since the slave does not always have empty transfer buffers, READY# remains deasserted. When the slave has generated sufficient empty buffers, it begins the transfer by accepting the data on the data bus 151 and asserting READY#.

In the present embodiment, the request for the first byte is indicated by asserting PACKET# in the first cycle after the command phase. The request for the second byte is indicated by keeping PACKET# asserted when the first byte is transferred. The request for the third byte is indicated by keeping PACKET# asserted when the second byte is transferred. In other words, PACKET# remains asserted through the cycle preceding the cycle that transferred the last bit of the data bytes. On the next cycle, PACKET# is deasserted, indicating that there are no more bytes that are requested. READY# is asserted to indicate that empty transfer buffers are available at the slave, and remains asserted with the transfer of the third byte. When there are no more data bytes requested, READY# is deasserted, ending the burst transaction 530.

C. Master-Aborted Transfers

A slave may not respond to a master's transfer request due to the request being outside of the slave's address space. According to the present embodiment, in the event that the slave does not respond with the READY# signal, the master must complete the transaction by deasserting PACKET# and then asserting PACKET# for one cycle. This allows bus trackers to return to a bus idle state and prepare for the next transaction.

Figure 6:
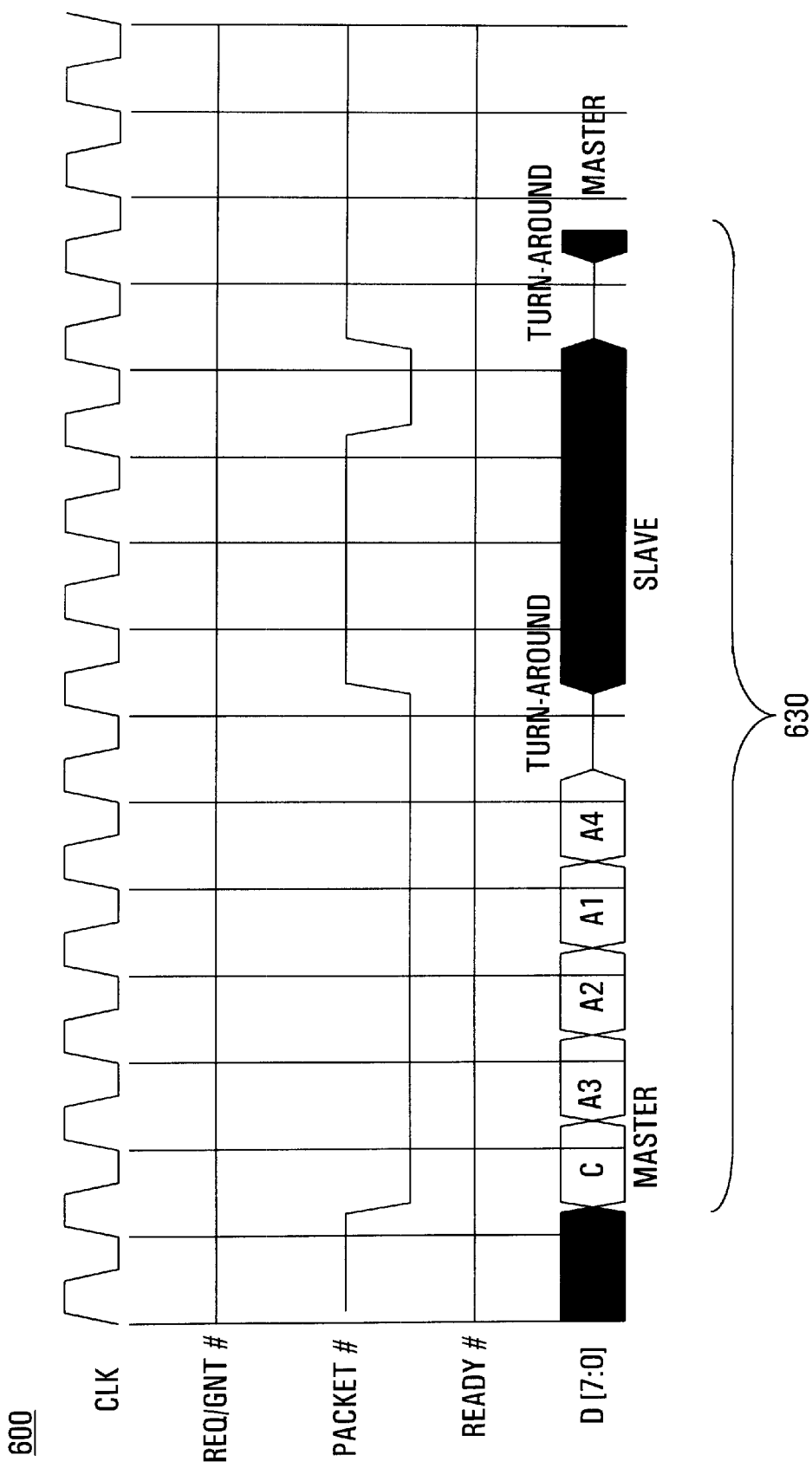
FIG. 6 illustrates an exemplary data read request abort transaction timing diagram in accordance with one implementation of the present invention.

A timing diagram 600 for a master aborted single byte read transaction 630 in accordance with one embodiment of the present invention is shown in FIG. 6. As illustrated, the transaction 630 was intended as a single byte read transaction. Accordingly, PACKET# has been deasserted when the master determines the need for a master abort. Thus, PACKET# could be pulsed active immediately to indicate a master abort. It should be noted that READY# is not asserted because the slave is not ready to provide the data.

Figure 7:
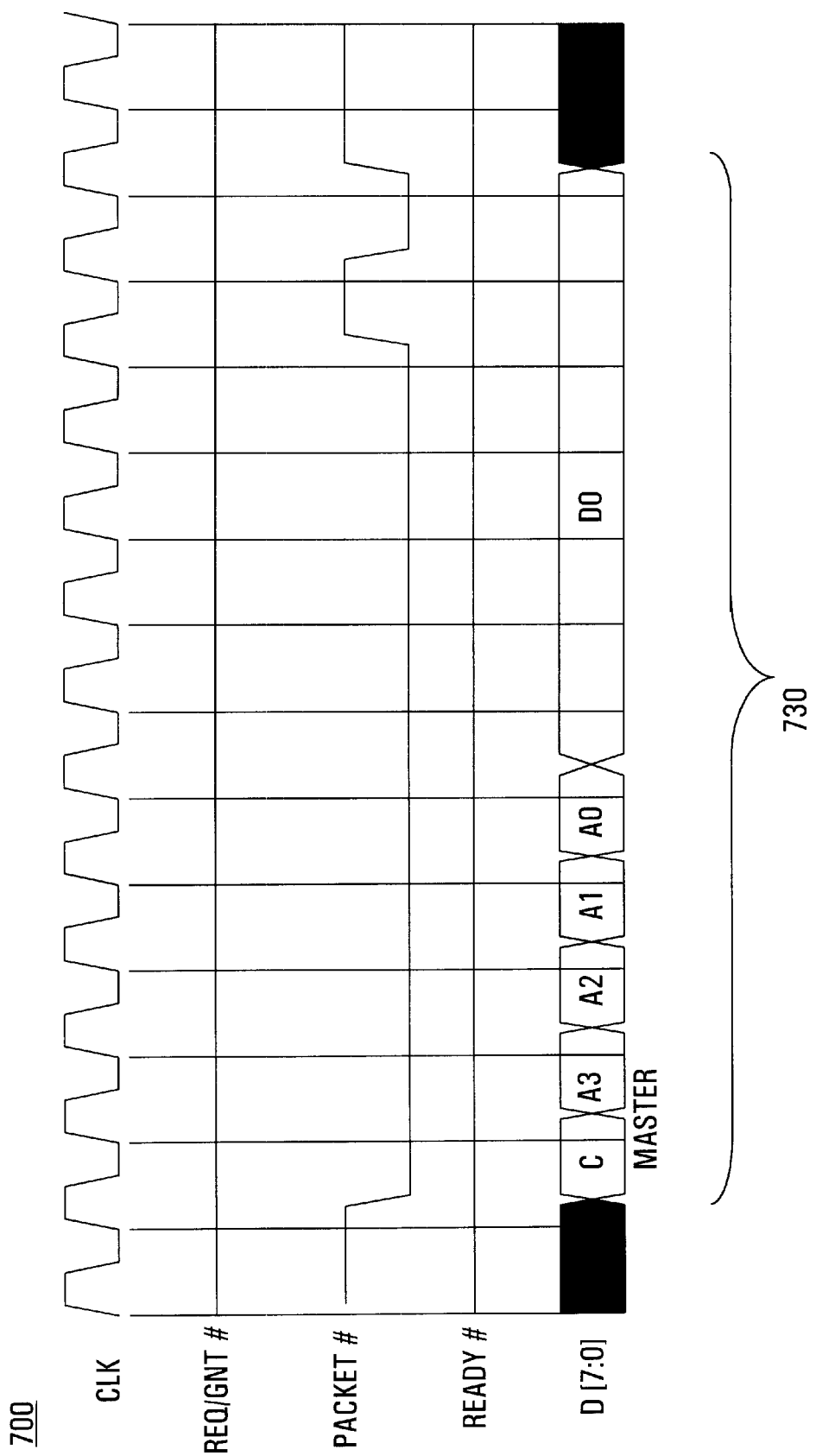
FIG. 7 illustrates an exemplary data write request abort transaction timing diagram in accordance with one implementation of the present invention.

A timing diagram 700 for a master aborted multiple byte write transaction 730 is shown in FIG. 7. Due to the multiple byte request, PACKET# remains asserted when the master determined the need for a master abort. Thus, PACKET# needs to be deasserted for one clock cycle prior to being pulsed active.

D. Slave-Disconnected Transfers

After a transaction has begun, the slave may determine after some number of transfers that it can no longer continue transferring data. This may be due to a device transitioning to a busy state or buffers becoming full. According to the present embodiment, when any condition arises that prevents the slave from continuing a data transfer, the slave will stop the data transfer by deasserting its READY# signal. The master will complete the transaction by deasserting its PACKET# signal on the following cycle.

Figure 8:
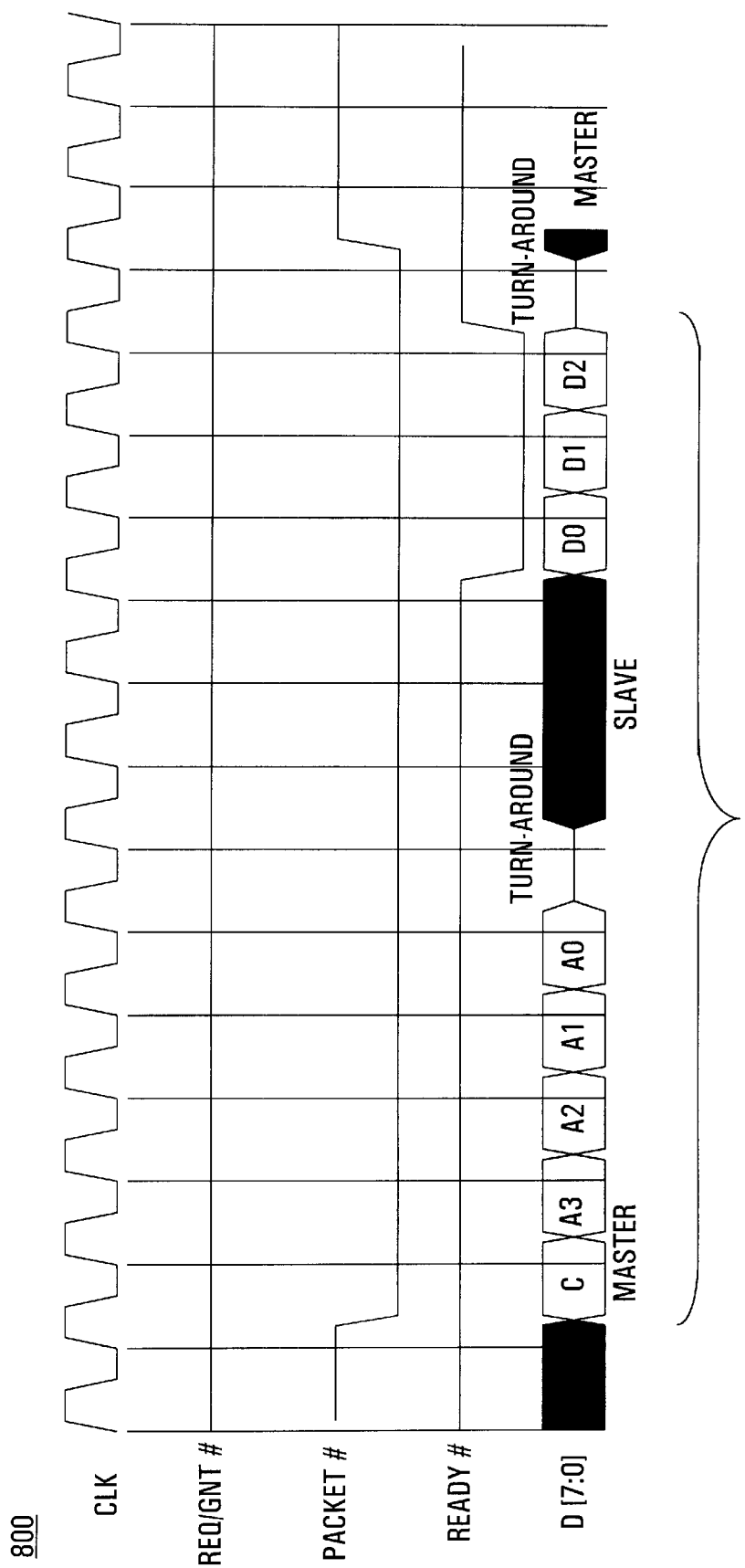
FIG. 8 illustrates an exemplary data read request disconnect transaction timing diagram in accordance with one implementation of the present invention.

FIG. 8 is a timing diagram 800 illustrating a read request disconnect transaction 830. As shown, the slave releases the data bus 151 in the same cycle that it deasserts READY#, so that the turn-around cycle occurs in the last cycle of the transaction. The master resumes driving the data bus in the same cycle that it deasserts PACKET#.

Figure 9:
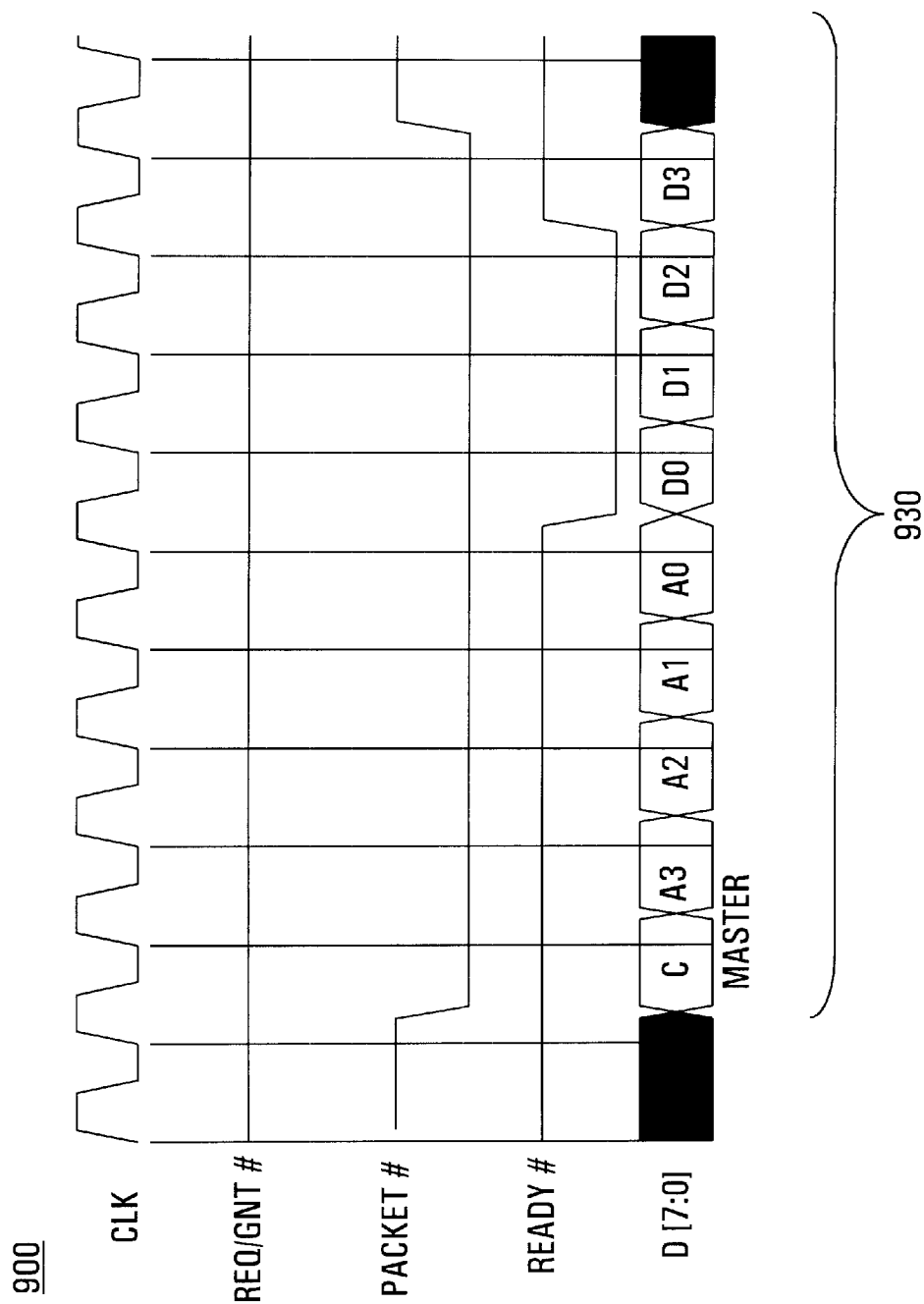
FIG. 9 illustrates an exemplary data write request disconnect transaction timing diagram in accordance with one implementation of the present invention.

FIG. 9 is a timing diagram 900 illustrating a write request disconnect transaction 930. As illustrated, there is no turn-around cycle and the master is driving a non-transferred byte in the last cycle of the transaction. The master will resume the transfer with the non-transferred byte.

E. Bus Arbitration

Figure 10:
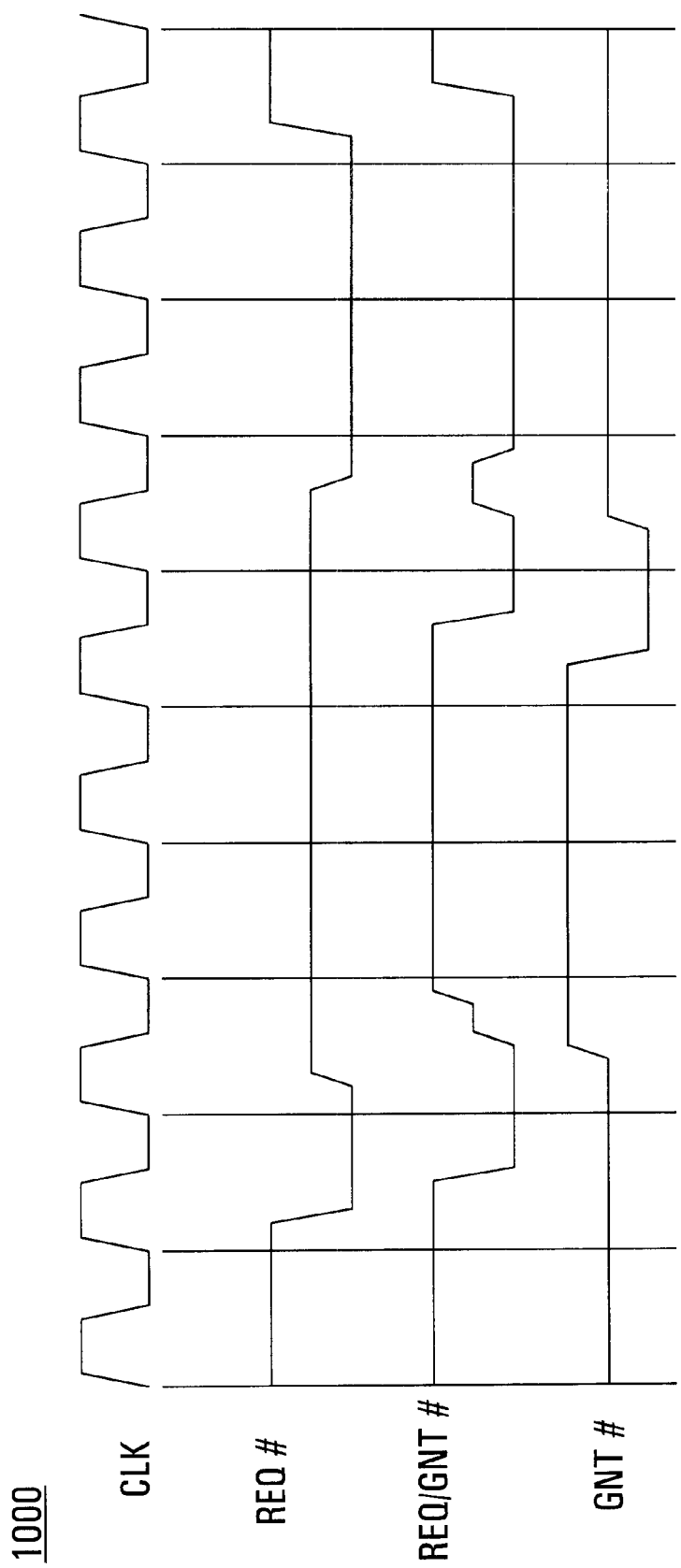
FIG. 10 illustrates an exemplary bus arbitration timing diagram in accordance with one implementation of the present invention.

In accordance with one embodiment of the present invention, bus ownership is resolved with an arbiter that is always located in the host. Bus arbitration is accomplished over a single signal line 155 with shared request and grant signaling. FIG. 10 is a timing diagram 1000 illustrating the single wire bus arbitration mechanism in accordance with the present embodiment. While REQIGNT# is, in the present embodiment, carried by a single wire 155, FIG. 10 separates the REQ/GNT# signal into REQ# (the companion sourced signaling) and GNT# (the host sourced signaling). The companion interface 122 acquires and releases the bus with the following steps.

STEP 1.

The companion interface 122 is the nominal source of signaling on the REQ/GNT# line 155. Therefore, by default, the companion interface 122 drives the line 155 high (false) while the host interface 114 is three-stated.

STEP 2.

When the companion interface 122 wishes to become the bus master, it asserts REQ# (drives the line 155 low) for one cycle, then allows line 155 to float.

STEP 3.

When the host interface 114 observes that REQ/GNT# was asserted, the host interface 114 enables a deasserted GNT# onto the line 155, and drives line 155 high.

STEP 4.

When the host interface 114 grants the ownership of the data bus 151 to the companion interface 122, the host interface 114 asserts GNT# for one cycle (driving the line 155 low), then three-states GNT#.

STEP 5.

When the companion interface 122 observes REQ/GNT# was asserted, it enables an asserted REQ# onto the wire.

STEP 6.

When the companion interface 122 wishes to relinquish the data bus 151, it deasserts REQ#.

According to the present embodiment, while the assertion of GNT# may occur so quickly as to create zero, one or any number of clock periods of high time between the initial REQ# and the GNT#, the companion does not re-assert REQ# within two clocks of the time it deasserted REQ#.

According to the present invention, the host interface 114 cannot preempt ownership of the data bus 151 and there is no limit on how long the companion interface 122 may keep the bus 151. Further, in one embodiment where the data bus 151 is dependent on register to register transfers, single burst transfers should not be interrupted. However, when a transaction is completed or interrupted, the companion interface 122 can release the bus 151 to allow the host interface 114 an opportunity for a transaction. If the companion interface gave up the bus 151 due to an interruption, it may request the bus 151 again after two clock cycles.

During bus idle periods, all signals must continue to be driven. During these bus idle periods, the bus 151 is termed as being "parked" on the device which is driving the bus signals. The current master is responsible for driving PACKET# and the data bus 151. The current slave is responsible for driving READY#. The host interface 114 is responsible for driving the clock signal CLK. The companion interface 122 is responsible for driving REQ/GNT#. In another embodiment, if the companion interface 122 always gives up the bus 151 at the end of its transaction, all data bus "parking" will be done by the host interface 114.

Figure 11:
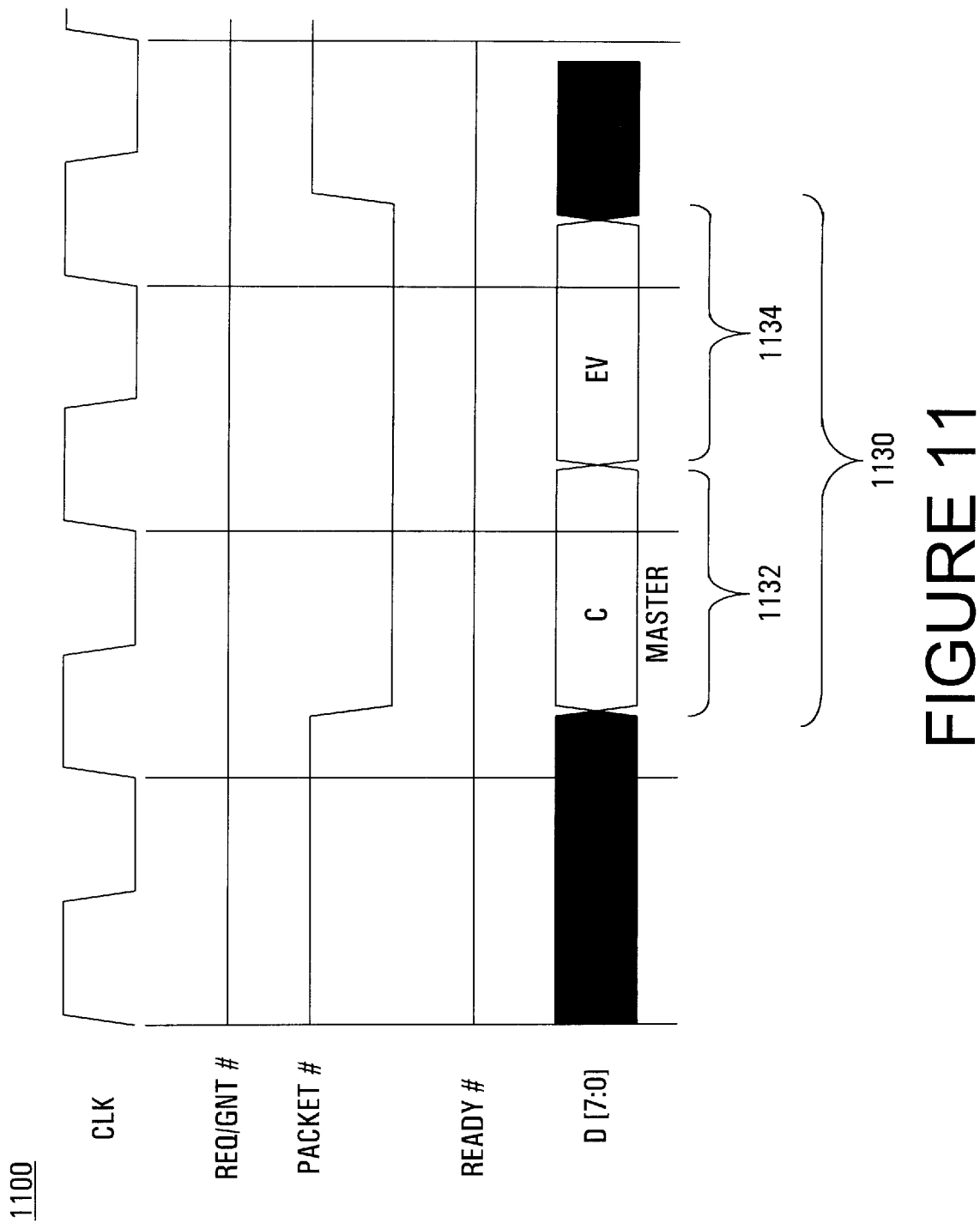
FIG. 11 illustrates an exemplary broadcast write transaction timing diagram in accordance with one implementation of the present invention.

F. Broadcast Events: Bus Width Negotiation Events, Interrupt Events, and Power Management Events FIG. 11 is a timing diagram 1100 illustrating a broadcast write transaction 1130 in accordance with one embodiment of the present invention. As illustrated the broadcast write transaction 1130 includes a command phase 1132 and an event phase 1134. Bus command is transferred during the command phase 1132 and event codes are transferred during the event phase 1134.

According to the present embodiment, broadcast write transaction 1130 is used during bus width negotiation procedure 1400. Particularly, the broadcast write bus command (e.g., bus command 0100) is transferred during the command phase 1132, and bus width negotiation events (e.g., Bus Width Inquiry and Set Bus Width) are transferred in the event phase 1134.

In addition to broadcasting bus width negotiation events, the broadcast write transaction 1130 may be used to broadcast interrupts. Interrupts are asynchronous events that occur in the companion device, and are communicated to the host device via broadcast cycles. In one embodiment of the present invention, eight different interrupt sources are provided to allow for differentiation of multiple functions in the companion device.

According to the present embodiment, the broadcast write transaction 1130 may also be used to broadcast power management events (e.g., event code 20h). Power management events are asynchronous events that occur in the companion device when the companion device requires a power state change. If the power state of the bus 151 is such that the clock signal CLK is stopped, then the bus 151 must be parked on the host device and the companion device must provide a mode that is capable of asserting its bus master request signal asynchronously.

G. Clock Control

Figure 12:
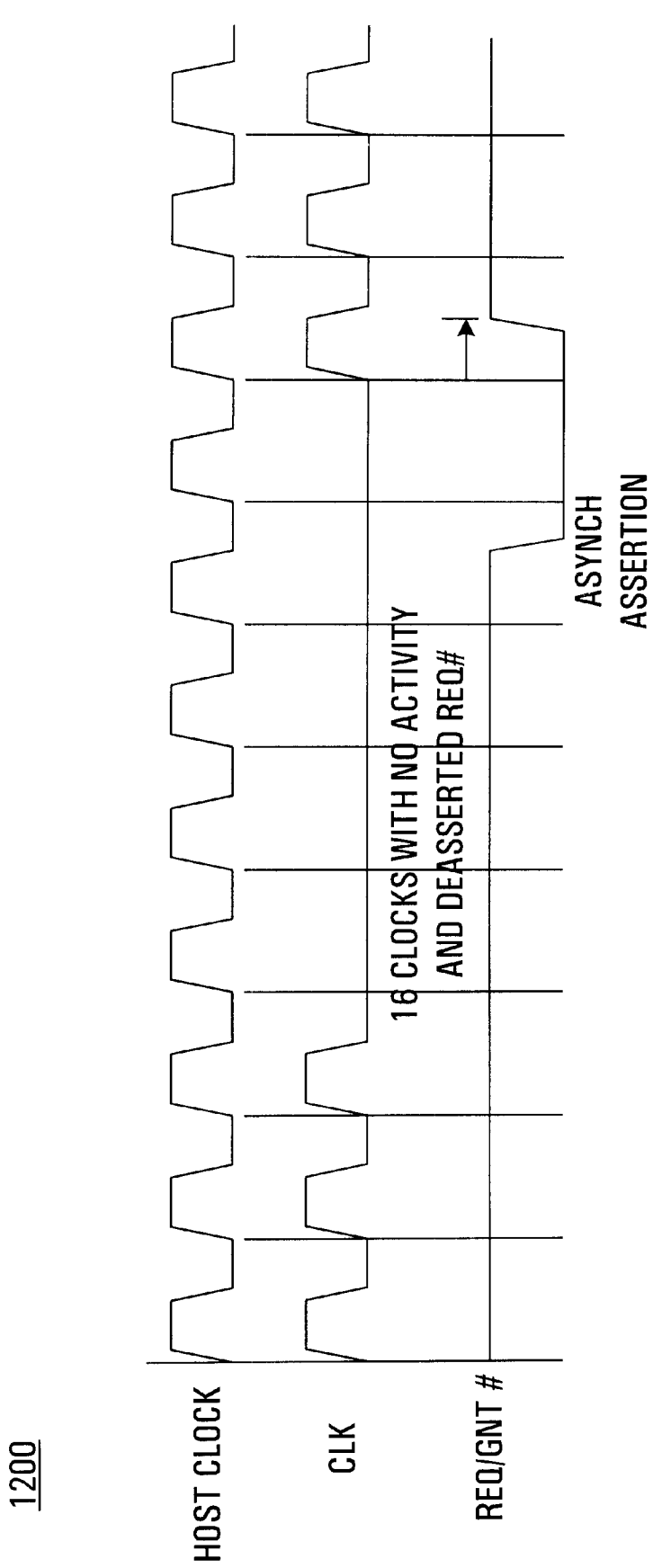
FIG. 12 illustrates an exemplary clock control timing diagram in accordance with one implementation of the present invention.

In furtherance of one embodiment of the present invention, the clock CLK may be stopped for power conservation or EMI reduction reasons by the host. FIG. 12 is a timing diagram 1200 illustrating the clock control mechanisms of the present invention. After a minimum of 16 clock cycles with no activity and no master request from the companion interface 122, the host interface 114 may stop the CLK in a low state. The clock signal CLK may be restarted by the host unilaterally when it needs to perform a bus transaction. The companion interface 122 may request a restart of the clock by asynchronously asserting its master request. There is no time limit for the host to respond to the request. The master request must be kept asserted until the first rising edge of the clock is detected, at which time the companion shall three-state the REQ/GNT# line. From that point on, the master request protocol is followed.

Since the preferred behavior of the companion is to relinquish ownership of the bus 151 immediately after the completion of any master transaction, the companion interface 122 has no method of dynamically keeping the clock running. If the companion interface 122 has circuitry that requires the clock CLK to be running when the bus 151 is idle, the host clock control circuitry must be disabled by a mode bit in a configuration register. The default state of this clock control mode bit is disabled, allowing the clock to run continuously.

The present invention, a system bus with a variable width data interface, has thus been disclosed. It should be appreciated that, while the present invention has been described in particular embodiments, the present invention should not be construed as limited by such embodiments, but rather construed according to the below claims.

What is claimed is:

1. A bus bridge for transferring data between devices of a computer system, said bus bridge comprising:
   a host bridge for coupling to a primary bus, said host bridge further comprising a host interface;
   a companion bridge for coupling to a secondary bus, said companion bridge further comprising a companion interface;
   a control bus coupled to said host interface and to said companion interface for transmitting control signals between said host interface and said companion interface; and
   a variable width data bus coupled to said host interface and to said companion interface for transmitting serialized data blocks between said host interface and said companion interface, wherein said host bridge and said companion bridge determines an effective width of said variable width data bus upon power-on reset of said computer system.

2. The bus bridge as recited in claim 1 wherein said host interface transmits a bus width inquiry to said companion interface upon power-on reset of said computer system.

3. The bus bridge as recited in claim 2 wherein said companion interface transmits information indicating a width of said companion interface to said host interface upon receiving said bus width inquiry.

4. The bus bridge as recited in claim 3 wherein said host interface sets said effective width of said variable width data bus to a smaller width of said host interface and said companion interface.

5. The bus bridge as recited in claim 1 wherein said effective width of said variable width data bus is one of 1-bit, 4-bit, 8-bit and 16-bit.

6. The bus bridge as recited in claim 1 wherein said control bus further comprises:
   a first signal line for transmitting a transaction request signal; and
   a second signal line for transmitting a data ready signal, wherein said transaction request signal and said data ready signal control data transfer transactions over said variable width data bus.

7. The bus bridge as recited in claim 6 wherein said control bus further comprises a third signal line for transmitting a bus arbitration signal, wherein said bus arbitration signal controls bus mastering of said variable width data bus.

8. The bus bridge as recited in claim 6 wherein said control bus further comprises a fourth signal line for transmitting a bus clock signal.

9. The bus bridge as recited in claim 1 wherein said primary bus is a primary Peripheral Component Interconnect (PCI) bus.

10. The bus bridge as recited in claim 1 wherein said secondary bus is a secondary PCI bus.

11. A bus bridge for transferring data between a parallel bus and a serial bus of a computer system, said bus bridge comprising:

a parallel interface for coupling to a parallel bus and for receiving bus commands, addresses and data from said parallel bus, a state machine coupled to said parallel interface for serializing said bus commands, said addresses and said data into data blocks; and a serial interface for coupling to a variable width serial bus for outputting said data blocks on said serial bus, wherein said serial interface has a variable effective width that is determinable at power-on reset of said computer system, and wherein a size of said data blocks varies according to said variable effective width.

12. The bus bridge according to claim 11 further comprising an initialization state machine for determining said effective width of said serial interface at power-on reset of said computer system.

13. The bus bridge according to claim 11 wherein said parallel bus is a Peripheral Component Interconnect (PCI) bus.

14. The bus bridge according to claim 11 wherein said variable effective width is one of 1-bit, 4-bit, 8-bit and 16-bit.

15. The bus bridge as recited in claim 11 wherein said serial interface further comprises:

a first signal line for transmitting a transaction request signal; and a second signal line for transmitting a data ready signal, wherein said transaction request signal and said data ready signal control data transfer transactions over said variable width serial bus.

16. The bus bridge as recited in claim 15 wherein said control bus further comprises a third signal line for transmitting a bus arbitration signal, wherein said bus arbitration signal controls bus mastering of said variable width serial bus.

17. The bus bridge as recited in claim 16 wherein said control bus further comprises a fourth signal line for transmitting a bus clock signal.

18. A method of establishing an effective width a serial bus that is coupled to a host interface and a companion interface, said method comprising the steps of:

(a) said host interface sending a first set bus width command to said companion interface to set said effective width of said serial bus to 1-bit;

(b) said host interface sending a bus width inquiry to said companion interface over said serial bus;

(c) in response to said bus width inquiry, said companion interface sending data indicative of a width of said companion interface to said host interface;

(d) upon receiving said data, said host interface comparing said width of said companion interface to a width of said host interface; and (e) said host interface setting said effective width to a smaller one of said host and companion interfaces by sending a second set bus width command to said companion interface.

19. The method as recited in claim 18 wherein said effective width of said serial bus is one of 1-bit, 4-bit, 8-bit and 16-bit.

20. The method as recited in claim 18 further comprising the step of skipping steps (b) to (e) when said width of said host interface is of 1-bit.

* * * * *